(12) United States Patent
Riepold et al.

(10) Patent No.: US 8,838,339 B2
(45) Date of Patent: *Sep. 16, 2014

(54) METHOD FOR DETERMINING A TORQUE ON A STEERING TRAIN

(75) Inventors: Thomas Riepold, Frechen (DE); Salvatore Oliveri, Filsen (DE)

(73) Assignee: Tedrive Holding BV (NL)

(*) Notice: Subject to any disclaimer, the term of this patent is extended or adjusted under 35 U.S.C. 154(b) by 1194 days.

This patent is subject to a terminal disclaimer.

(21) Appl. No.: 11/777,048

(22) Filed: Jul. 12, 2007

(65) Prior Publication Data

US 2008/0015749 A1    Jan. 17, 2008

(30) Foreign Application Priority Data

Jul. 13, 2006  (DE) .................. 10 2006 032 686
Jun. 8, 2007   (DE) .................. 10 2007 027 041

(51) Int. Cl.
| | | |
|---|---|---|
| B62D 6/00 | (2006.01) | |
| G01L 5/22 | (2006.01) | |
| B62D 6/10 | (2006.01) | |
| B62D 15/02 | (2006.01) | |

(52) U.S. Cl.
CPC . *G01L 5/221* (2013.01); *B62D 6/10* (2013.01); *B62D 15/0235* (2013.01); *B62D 15/0215* (2013.01)
USPC .................. 701/42; 180/446; 701/41

(58) Field of Classification Search
USPC ........ 701/41, 42, 43, 44; 702/41; 73/862.041; 180/402, 443, 446
See application file for complete search history.

(56) References Cited

U.S. PATENT DOCUMENTS

| | | | | |
|---|---|---|---|---|
| 5,135,067 A | * | 8/1992 | Kohata et al. ............ | 180/445 |
| 6,415,212 B2 | * | 7/2002 | Nishizaki et al. .......... | 701/41 |
| 2002/0050178 A1 | * | 5/2002 | Desbiolles ........... | 73/862.193 |
| 2002/0121402 A1 | * | 9/2002 | Takeuchi et al. .......... | 180/446 |
| 2003/0079933 A1 | * | 5/2003 | Chabaan ................. | 180/446 |
| 2003/0100981 A1 | * | 5/2003 | Suzuki .................... | 701/43 |
| 2003/0141134 A1 | * | 7/2003 | Sherwin et al. .......... | 180/402 |
| 2003/0144780 A1 | | 7/2003 | Recket et al. | |
| 2004/0200661 A1 | * | 10/2004 | Sugitani et al. .......... | 180/402 |
| 2004/0262073 A1 | * | 12/2004 | Husain et al. ............ | 180/443 |
| 2005/0016789 A1 | * | 1/2005 | Asada .................... | 180/444 |
| 2005/0016791 A1 | * | 1/2005 | Fukushima et al. ........ | 180/446 |
| 2005/0284688 A1 | * | 12/2005 | Deville .................. | 180/443 |

FOREIGN PATENT DOCUMENTS

| | | |
|---|---|---|
| DE | 10034135 C1 | 10/2001 |
| DE | 10103404 A1 | 8/2002 |
| DE | 102004035744 A1 | 4/2005 |
| DE | 600684 T2 | 6/2005 |
| DE | 102005046014 A1 | 4/2006 |
| DE | 60225628 T2 | 4/2009 |
| EP | 460417 A1 * | 12/1991 |
| EP | 1026068 A2 | 8/2000 |
| EP | 1270369 A2 | 1/2003 |
| WO | 2006035016 A1 | 4/2006 |

* cited by examiner

*Primary Examiner* — Stephen Holwerda
(74) *Attorney, Agent, or Firm* — Cantor Colburn LLP

(57) ABSTRACT

Disclosed is a method for determining the torque introduced into a drive train, the method including the process steps of determining angular signals with the help of two sensors between which a region of the steering train is located which is subjected to a torque evaluating the differences of the angular signals taking into account known torsional rigidity of the steering train.

9 Claims, 4 Drawing Sheets

METHOD FOR DETERMINING A TORQUE ON A STEERING TRAIN

Figure 1:
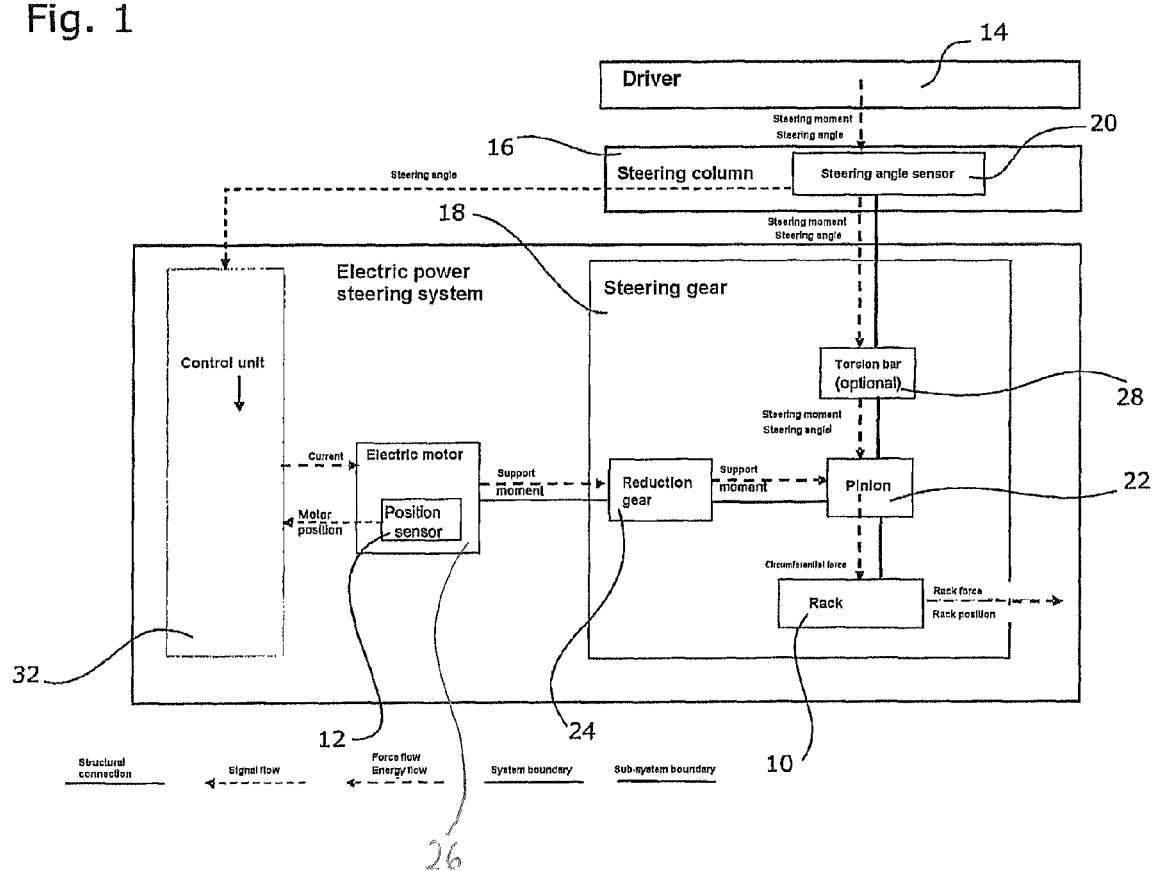

The present invention relates to a method for determining a torque on a steering train of a motor vehicle.

The invention refers to electric power steering systems with and without mechanical connection between the steering wheel and the steered wheels (electronic power steering (EPS) and steer by wire).

With a conventional steering system, steerable wheels are steered by a driver via an actuation unit, more preferably through twisting a steering wheel. The rotating of the steering wheel causes a displacement of a rack which in turn pivots the wheels. In power steerings the steering movement of the driver is supported through an additional electric motor. Here, the steering support is generally performed through characteristic-controlled or regulated systems where the steering support is applied as a function of the vehicle speed.

In addition, steering systems are known where no mechanical connection exists between the steerable wheels and the steering wheel (steer by wire). Here, the wheels are pivoted as a function of the angle of rotation and the rotational speed of the steering wheel with the help of appropriate motors. A substantial problem of these systems consists in that the driver receives no tangible feedback from the wheels any longer.

In addition, modern vehicles are usually equipped with dynamic drive systems which for example can influence the stability of the vehicle. Such a dynamic drive system continuously determines data for driver support. By linking for example slip control, brake and drive stability systems (anti-lock brake system (ABS), automatic stability control (ASC), dynamic stability control (DSC), electronic stability program (ESP), etc.) one succeeds in increasing the active safety and the driving comfort in this way relieving the driver, they help the driver to safely control his vehicle even in critical situations. Such systems come into action only when for example the tyres are at risk of loosing the adhesion, i.e. before the wheel spin, skid or block. Wheel sensors for example monitor how fast the wheels rotate during the braking operation. If a wheel tends to block the brake pressure on the corresponding wheel brake cylinder is automatically reduced so far until the wheel returns to running under normal slip.

With the drive slip control, sensors ensure that the drive power during acceleration is transmitted with minimal slip. Regardless of the position of the accelerator pedal, only so much engine power is permitted as is possible in the current driving situation without spinning wheel. By sensing the wheel speeds through sensors this system recognizes if the wheels grip safely. If the driven wheels have a tendency towards spinning, the control intervenes in the engine management and reduces the torque regardless of the current accelerator pedal position.

With the dynamic stability control additional sensors determine additional driving states in order to increase the driving safety during abrupt evasive manoeuvres or sudden danger situations. Expansion of the ABS increases the driving stability particularly when braking in curves. The control system controls the brake pressures below the ABS control threshold through brake pressures of different amounts on the right and left for stabilizing counter-moments. In addition, dynamic brake management systems are known which support the braking of the driver or for example accelerate the braking operation.

Sensors determine the yaw rate which indicates how fast the vehicle rotates around its normal axis, the lateral acceleration as dimension for curve radius and speed, the steering angle, which indicates the desired direction and the braking pressure exerted by the driver via the pedal as well as the rotational speed of the individual wheels. The abovementioned embodiments must only be understood exemplarily, drive dynamic data is also determined and utilized through additional systems.

Electric power steering systems generally utilize a separate torque sensor assigned to the steering system for measuring the steering moment applied to the steering wheel by the driver. This torque sensor usually serves exclusively for measuring the torque but can also be combined with an angle-of-rotation-sensor. In addition to this, indirect torque measurement is also known where, via the twisting angle of two parts of the steering column or the steering gear connected with an elastic element designed for this purpose, such as a torsion bar, the torque is determined. Also known is a direct torque measurement on a component of the steering train for example according to a magneto-elastic principle.

With the indirect moment measurement in electric power steerings, two operational principles are customary:
  A differential angle sensor which exclusively measures the angle difference directly between the two parts connected with the torsion bar (mostly input shaft and pinion),
  Two separate rotationally acting angle sensors one of which in each case is mounted on to one of the parts of the steering connected with the torsion bar. The torque is determined from the difference of the angular signals of the two sensors.

However, in each case a moment sensor is required which usually assigned to the power steering (electronic power assist steering (EPAS) system) and, if applicable, is integrated in the EPAS system.

Depending on the concept of the control or regulation of the steering system the torque signal is used to amplify the steering commands of the driver in terms of steering support in the same direction of rotation or to adjust a constant torque on the steering wheel in the sense of feedback to the driver via the steering angle.

Disadvantageous with the known systems is that torque sensors used are elaborately designed and expensive.

The object of the present invention consists in creating a method for determining the torque applied to a steering system which can be manufactured preferably cost-effectively and yet functions reliably and measures accurately.

According to the invention the object is solved through a method for determining a torque applied by a driver to a steering train with the method steps:
  determining angular signals with the help of two sensors between which a region of the steering train is located, which is subjected to a torque
  evaluating the differences of the angular signals taking into account known torsional rigidity of the steering train.

With the help of the method it is thus possible without a torque sensor explicitly provided for this purpose to determine the torque applied to the steering train. The torque sensor which is costly and, as additional component, requires space, can be omitted. In addition, a steering angle sensor which is usually integrated in the steering column or in the steering gear, can be abandoned. According to the invention a value is derived for the first time from the data which up to now was only determined for the drive dynamics which is substantial for the steering system and can be converted by said steering system.

As angular signals to be evaluated, steering angle signals of the steering train are suitable on the one side of the relevant region of the steering train which can be determined in the steering column or in the steering gear. On the other side are available:

Angular signals which are determined via a position sensor of an electric motor which is available anyhow which supports the rotation of the steering train or the displacement of the rack, or Angular signals which are determined via a position sensor on the rack.

With the help of the position sensor in the electric motor it is always possible to determine an accurate position of the rack or the wheels. In principal, all electric motors which include a position sensor such as for example brushless electric motors are suitable for the method according to the invention.

However, according to the invention, a sensor and a receiver component can also be provided which in each case can be arranged on the moveable rack and a fixed component, for example the rack housing. More preferably, so-called PLCD sensor systems (permanent linear contactless displacement) are suitable where a magnetic element is displaced and the magnetic field behavior can be redundantly sensed via a dense system. The path of the magnetic element can then be passed on as control signal. The magnetic element is thus arranged on the rack and moves with said rack. The receiver is arranged fixed in the housing as coil or arrangement of several coils. The housing is preferably manufactured of aluminum or a similar material. As an option, the evaluation unit can be integrated in the sensor.

As an alternative, a position sensor can also be used which is designed according to the short circuit ring principle. A short circuit ring or several short circuit rings is/are arranged on the rack and the coil or the coil in the housing in a fixed manner. Optionally the evaluation unit can be integrated in the sensor.

These sensors are constructed simpler and sturdier and can be manufactured and installed more cost-effectively than the known sensors arranged in the steering gear and/or on the steering column.

Substantial for the invention is the knowledge of the torsional rigidity of the steering train between the sensors in order to be thus able to reliably determine the torsion or the torque. If the torsional rigidity cannot be determined easily, a torsion bar can be additionally provided which determines the torsion. A torsion bar is a bar with fixed clamping at both ends wherein the fastened components are able to perform a swivel motion around the axis of rotation relative to each other. The torsional rigidity of such a torsion bar can be determine or known.

Figure 2:
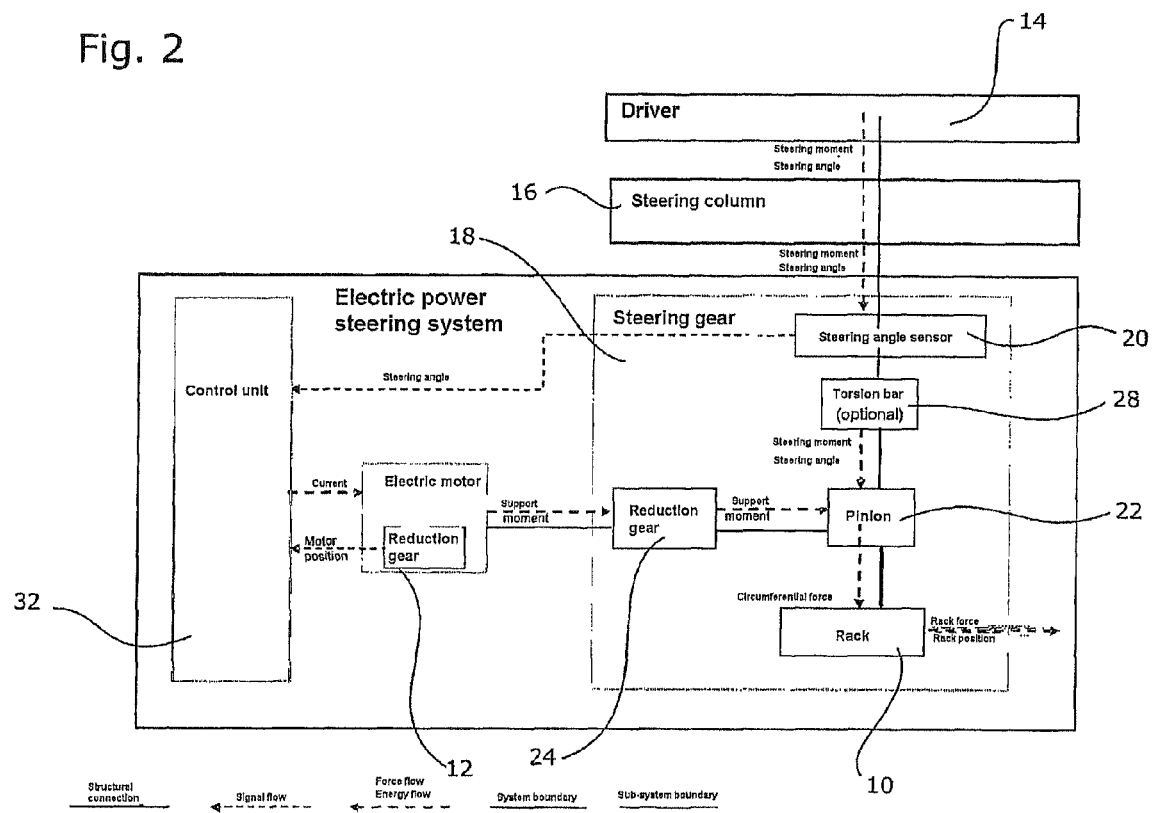
Figure 3:
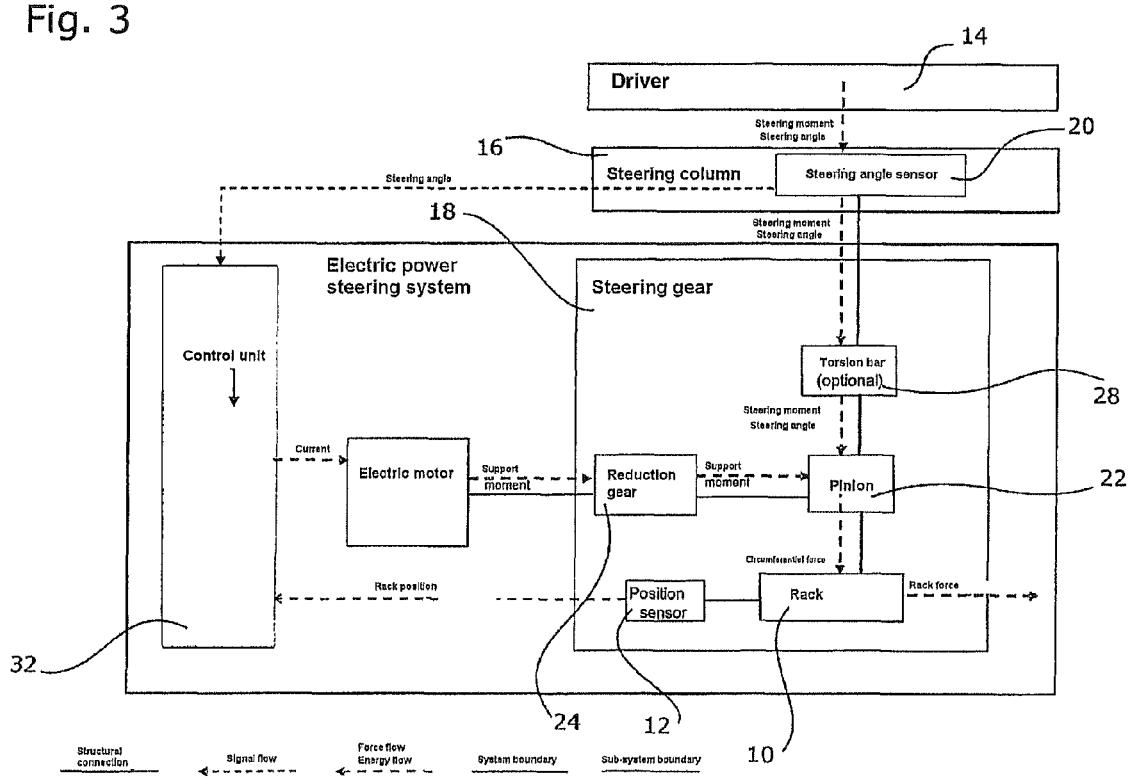
Figure 4:
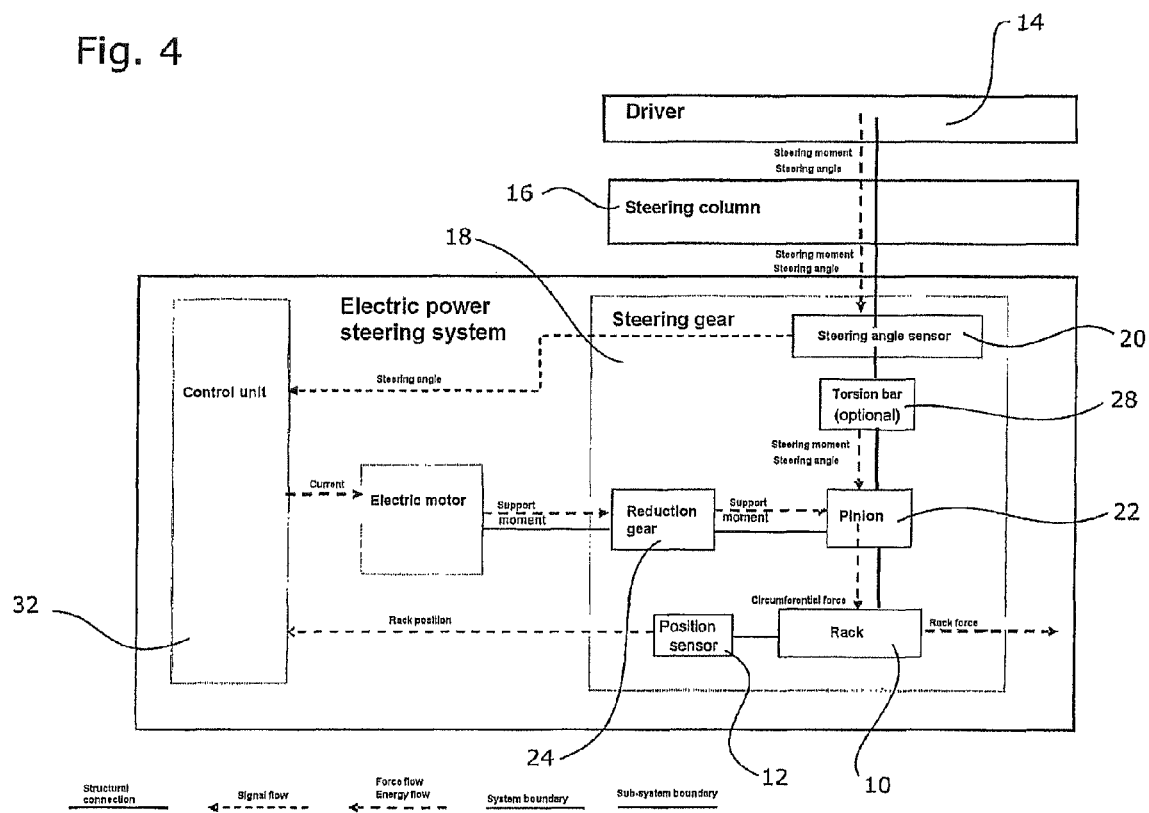

The invention is explained in more detail by means of the enclosed figures. These must only be understood exemplarily and are not intended to restrict the invention. It shows:

FIG. 1: a schematic representation of an electric power steering for utilizing the method according to the invention with a steering angle sensor in a steering column and a position sensor in the electric motor, FIG. 2: a schematic representation of a further electric power steering for the utilization of the method according to the invention with a steering angle sensor in a steering gear and a position sensor in the electric motor, FIG. 3: a schematic representation of a further electric power steering for the utilization of the method according to the invention with a steering angle sensor in a steering column and a position sensor on a rack, FIG. 4: a schematic representation of a further electric power steering for the utilization of the method according to the invention with a steering angle sensor in a steering gear and a position sensor on a rack.

Each of the Figures shows a schematic diagram for the utilization of a steering system according to the invention. As can be seen from the respective associated legend, structural connections, signal flow or force flow or energy flow are possible between the shown components. System boundaries and subsystem boundaries are represented through different line strengths. In the steering systems according to the FIGS. 1 and 2 a position sensor 12 is located in an electric motor 26, in the steering systems according to the FIGS. 3 and 4 it is located on a rack 10.

The electric motor 26 which supports the rotation of the steering train or a displacement of a rack which pivots the wheels can also contain a position sensor 12 through which the current position of the wheels or the steering angle can be deduced.

The position sensor 12 which is arranged on the rack 10 can for example be formed through a PLCD sensor system. This position sensor 12 determines the position of the rack 10 in the ratio to a fixed component, preferably a rack housing.

In all shown steering systems it is shown that a driver 14 applies a steering moment via a steering column 16 to a steering gear 18. Optionally the steering column 16 can have a steering angle sensor 20 according to the state of the art (compare FIG. 2).

The steering gear 18 in all cases has a pinion 22 via which the steering moment is transmitted to the rack 10. The steering moment is supported through a reduction gear 24 which in turn is driven by an electric motor 26. As an option, the steering gear 18 also has a torsion bar 28. Via the torsion bar it is possible to determine a steering moment acting on the steering gear 18.

According to the FIGS. 1 and 3 a steering angle sensor 30 is provided in the steering gear 18 which determines the steering angle. The determined steering angle is transmitted to a control unit 32 which likewise receives data determined by the position sensor. The control unit 32 is thus able from the received angular data to determine the optimal support moment.

In the embodiment according to the FIGS. 2 and 4 the steering angle sensor 20, as already explained above, is not arranged in the steering gear 18 but in the steering column 16.

Through the position sensor 12 on the rack 10 or in the electric motor 26 and the steering angle sensor 20, either arranged in the steering gear 18 or on the steering column 16, it is possible to determine the applied steering moment of the driver 14. To this end, the known stiffness between the steering angle sensor 20 and the position sensor 12 or optionally the torsion bar 28 can be utilized for the calculation.

The Figures explain only a possible application example for the steering system according to the invention. In determining the steering moment it may be adequate for different applications to merely determine the position of the rack 10 through the position sensor 12. The invention is not restricted to the described exemplary embodiment but rather comprises all embodiments acting in like manner.

The invention claimed is:

1. A method for determining a torque on a steering train of a motor vehicle applied by a driver, the method comprising the process steps of:

providing a steering column absent a torque sensor positioned and configured to directly measure torque on the steering train;

providing an electric motor in an electric power steering system that supports at least one of rotation of the steering train and displacement of a movable rack that pivots wheels of the motor vehicle;

sensing a first steering angle via a position sensor disposed with the electric motor, the position sensor configured to generate a signal based on the position of the electric motor;

transmitting steering angle data about said first steering angle from the position sensor to a control unit;

providing a steering angle sensor with at least one of a steering gear or the steering column of the motor vehicle;

sensing a second steering angle via the steering angle sensor;

transmitting additional steering angle data about said second steering angle from the steering angle sensor to the control unit;

providing known torsional rigidity of the steering train between the position sensor and the steering angle sensor;

evaluating any differences in the steering angle data and the additional steering angle data in the control unit utilizing the known torsional rigidity of the steering train, the control unit determining the torque on the steering train as applied by the driver based on the evaluated differences utilizing the known torsional rigidity of the steering train between the respective sensors; and using the determined torque to amplify the steering commands of the driver by providing steering support in the same direction of rotation, or to adjust a constant torque on the steering column by providing feedback to the driver via the steering angle.

2. The method according to claim 1, wherein the electric motor is a brushless electric motor.

3. The method according to claim 1, wherein the torsional rigidity of the steering train is determined through a torsion bar.

4. The method of claim 1, wherein said determining of said torque occurs absent input from a torque sensor disposed with the steering column.

5. A method for determining a torque on a steering train of a motor vehicle applied by a driver, the method comprising the process steps of:

providing a steering column absent a torque sensor positioned and configured to directly measure torque on the steering train;

providing an electric motor in an electric power steering system that supports at least one of rotation of the steering train and displacement of a movable rack that pivots wheels of the motor vehicle;

sensing a first steering angle via a position sensor disposed with the rack;

transmitting steering angle data about said first steering angle from the position sensor to a control unit;

providing a steering angle sensor with at least one of a steering gear or the steering column of the motor vehicle, wherein the steering gear includes a pinion gear coupled between the steering column, the electric motor and the rack, the position sensor being arranged opposite the pinion gear from the steering angle sensor;

sensing a second steering angle via the steering angle sensor;

transmitting additional steering angle data about said second steering angle from the steering angle sensor to the control unit;

providing known torsional rigidity of the steering train between the position sensor and the steering angle sensor;

evaluating any differences in the steering angle data and the additional steering angle data in the control unit utilizing the known torsional rigidity of the steering train, the control unit determining the torque on the steering train as applied by the driver based on the evaluated differences utilizing the known torsional rigidity of the steering train between the respective sensors; and using the determined torque to amplify the steering commands of the driver by providing steering support in the same direction of rotation, or to adjust a constant torque on the steering column by providing feedback to the driver via the steering angle.

6. The method according to claim 5, wherein the position sensor is attached on the moveable rack and a receiver component is arranged on a fixed component.

7. The method according to claim 6, wherein a magnetic element is operably coupled to move with the movable rack and the position of movable rack is determined by a magnetic field of the magnetic element.

8. The method according to claim 5, wherein the position sensor is configured to implement the short circuit ring principle.

9. The method according to claim 8, wherein a short circuit ring or a plurality of short circuit rings are arranged on the movable rack and a coil or a plurality of coils are arranged in a fixed manner in a housing.

* * * * *